July 11, 1939. H. NOVACK 2,165,295
BIRD NEST
Filed Feb. 8, 1938
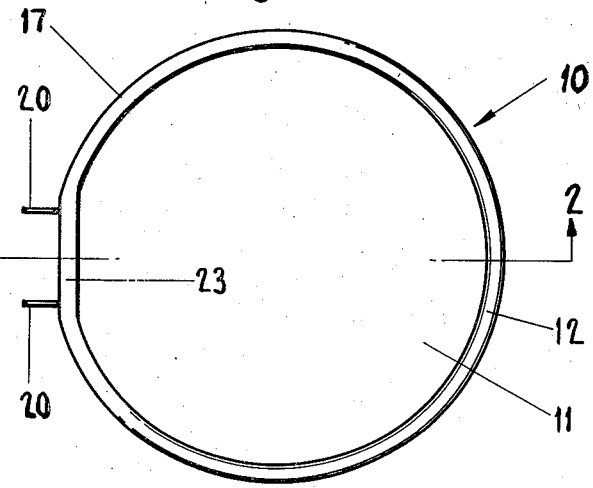
Fig. 4 Fig. 1
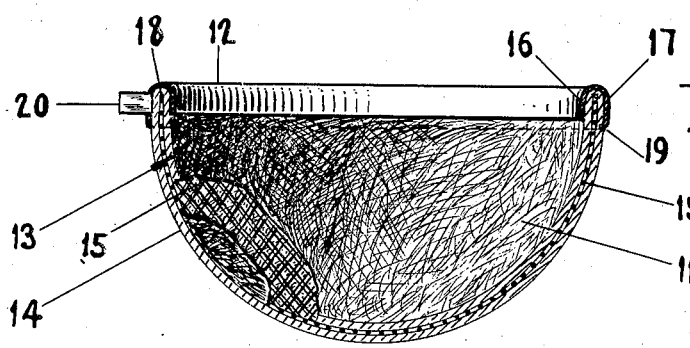
Fig. 2
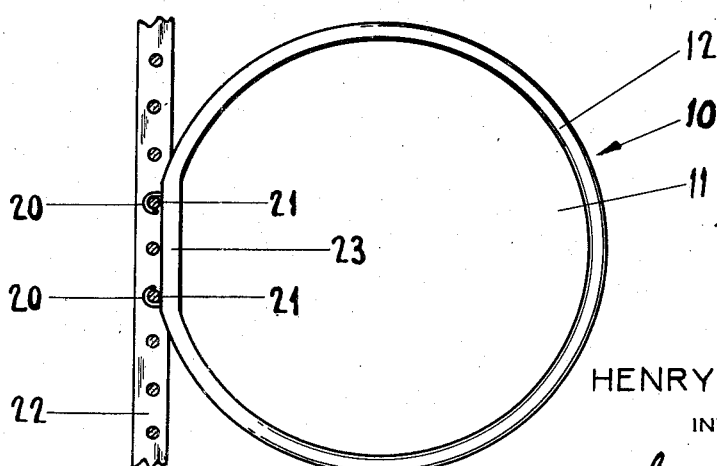
Fig. 3
HENRY NOVACK
INVENTOR
BY *Joseph Blacker*
ATTORNEY Patented July 11, 1939

2,165,295

UNITED STATES PATENT OFFICE 2,165,295

BIRD NEST

Henry Novack, Brooklyn, N. Y.

Application February 8, 1938, Serial No. 189,339

3 Claims. (Cl. 119—45)

This invention relates to bird nests and particularly to a nest designed to be mounted in connection with bird cages and which is adapted for use in the breeding of birds, such as canaries.

An object of this invention is to provide a nest of the character described, comprising inner and outer layers of feltable fibres and having an intermediate fabric layer made of fairly wide mesh burlap.

Another object of this invention is to provide a composite nest comprising an annular metallic housing having an annular recess designed to receive the upper edge portion of a pressed felt nest of substantially semi-spherical cross-section.

Another object of this invention is to provide, in conjunction with my composite bird nest, the said housing comprising two tongues adapted to be bent around the vertical bars of a bird cage to effectively hold the nest to the cage.

Another object of this invention is to provide a hollow annular housing having an outer wall of wider extent than the inner wall and to bend the lower edge of the outer wall inwardly for clamping the nest body to the housing.

With the above and other objects in view, the invention will be hereinafter more particularly described, and the combination and arrangement of parts will be shown in the accompanying drawing and pointed out in the claims which form part of this specification.

Reference will now be had to the drawing, wherein like numerals of reference designate corresponding parts throughout the several views, in which:

Figure 1 is a plan view of my bird nest.

Figure 2 is a cross-sectional view, the section being taken as on line 2—2 in Figure 1, a portion of the nest body being broken away to show that it is made up of three layers.

Figure 3 is a plan view of my nest installed in a bird cage by bending two tongues around two vertical bars of the cage.

Figure 4 is a side view of the housing.

In the illustrated embodiment of the invention, the numeral 10 indicates a bird nest comprising a nest body 11 of substantially semi-spherical cross-section and an annular housing 12 preferably made of sheet metal.

The nest body 11 comprises an inner layer 13 and an outer layer 14 of loosely felted animal hair and an intermediate layer of loosely woven fabric 15 such as burlap having a fairly wide mesh. The loosely felted layers of hair are held together in unitary relation with the burlap fabric in any suitable manner. The inner and outer layers are stiffened and strengthened by the said intermediate layer. The semi-spherical form of the nest body 11 may be produced by molding and stretching between dies under pressure.

The annular housing 12 is of inverted U-shaped cross-section and comprises an inner wall 16 and an outer wall 17. The outer wall 17 is preferably of wider extent than the inner wall and extends to a lower elevation than the inner wall. The housing 12 has an annular recess 18 designed to receive the upper edge portion of the nest body. When the nest body 11 is inserted into the annular recess 18, the lower edge 19 of the outer wall 17 is in-turned all around and forced radially inwardly of the nest and enters the outer layer 14 and clamps the housing 12 and nest body 11 in unitary relation.

As shown in Figures 1 and 4, the outer wall 17 of the housing 12 has two tongues 20, 20 pressed therefrom. As shown in Figure 3 the tongues 20 have been bent around two vertical bars 21, 21 extending from a horizontal rail 22 of a bird cage and serve to effectively hold the nest 10 to the cage. The housing 12 has a flattened portion 23 to facilitate alinement with the bars 21 of the cage.

It is to be noted that when a bird occupies the nest 10, it finds comparatively loose hair which it can extract from the inner layer 13 for building or augmenting the nest, and, while the continual removal of hair may form a hole in the inner layer, the nest remains serviceable because the bird has sufficient nest making material to draw upon from the inner layer of loose fibres and if it should want to go deeper the hard burlap layer acts as a deterent so that under practical conditions the outer layer is without any tendency to destructive actions by the bird.

It is to be noted that my nest body may be used as a lining inside any type of nest and be removably mounted therein.

In accordance with the provisions of the patent statutes I have described the operation of my invention, together with the construction which I now consider to represent the best embodiment thereof; but I desire to have it understood that the device shown is only illustrative and that the invention may be carried out by other means within the scope of the appended claims.

I claim:

1. A reinforced nest of the class described, comprising an annular housing made of rigid material and having an annular recess at its lower face, a nest body of semi-spherical cross-section and comprising inner and outer layers of loosely felted materials and an intermediate coarse fabric layer held in unitary relation with said inner and outer layers, said annular recess being designed to receive the upper edge portion of said nest body, said housing comprising outer and inner walls, one of said walls extending below the other wall, the lower edge of said lower wall being inturned to clamp said nest body upwardly against the lower edge of said other wall, said housing having a portion adapted to contact a plurality of vertical bars of a cage, and means projecting from said portion of said housing and adapted to be bent around the bars of a bird cage and effectively hold the nest to the cage.

2. A reinforced nest of the class described, comprising an annular housing made of rigid material and having an annular recess at its lower face, a nest body comprising inner and outer layers of loosely felted materials and an intermediate coarse fabric layer held in unitary relation with said inner and outer layers, said annular recess being designed to receive the upper edge portion of said nest body, said housing comprising outer and inner walls, said outer wall extending below said inner wall, the lower edge of said outer wall being inturned all around to clamp said nest body upwardly against the lower edge of said inner wall, said housing having a flattened portion adapted to contact a plurality of vertical bars of a cage, and means projecting from said flattened portion of said housing and adapted to be bent around the bars of a bird cage and effectively hold the nest to the cage.

3. A bird nest comprising three members constituting concentric hemispheres, the central member being of a coarse fabric and the outer members being each of felted fibres including loosely felted animal hair, all said members being firmly attached together, said nest having a protective covering all around its upper edge, said covering being of annular form and of U-shaped cross-section and being designed to entirely conceal the upper portion of said nest and to partly conceal the inner and outer surfaces of said nest body at said upper edge, and means for securing said protective covering to said nest body.

HENRY NOVACK.